United States Patent [19]

Ulmer et al.

[11] Patent Number: 4,468,044
[45] Date of Patent: Aug. 28, 1984

[54] CYLINDER HEAD GASKET FOR INTERNAL COMBUSTION ENGINE

[75] Inventors: Georges Ulmer, Lyons; Bernard C. D. Genin, Venissieux, both of France

[73] Assignee: Societe Anonyme dite: Curty, Saint-Priest, France

[21] Appl. No.: 465,894

[22] Filed: Feb. 11, 1983

[30] Foreign Application Priority Data

Feb. 12, 1982 [FR] France .................. 82 02648

[51] Int. Cl.³ .................................. F16J 15/08
[52] U.S. Cl. .......................... 277/235 B; 277/166
[58] Field of Search ............ 277/235 B, 166, 22, 277/234

[56] References Cited

U.S. PATENT DOCUMENTS

| | | | |
|---|---|---|---|
| Re. 19,874 | 2/1936 | Victor | 277/234 |
| 3,519,281 | 7/1970 | Teucher et al. | 277/235 B |
| 3,784,212 | 1/1974 | Doerfling | 277/235 B |
| 4,103,913 | 8/1978 | McDowell | 277/235 B |
| 4,121,846 | 10/1978 | Skrycki | 277/235 B |
| 4,390,185 | 6/1983 | Nicholson | 277/235 B |

*Primary Examiner*—Robert I. Smith
*Attorney, Agent, or Firm*—Karl F. Ross; Herbert Dubno

[57] ABSTRACT

A cylinder head gasket for internal combustion engines has all-metal composite refractory seal around each of the cylinder openings and elastomeric seals around each of the liquid passages, the latter being symetrically disposed on opposite sides of the central plate. The refractory seals comprise ribbed sheet metal members disposed symetrically and having perimeters extending inwardly at each cylinder opening, and cover members reaching from one side and the other over the perimeters.

17 Claims, 5 Drawing Figures

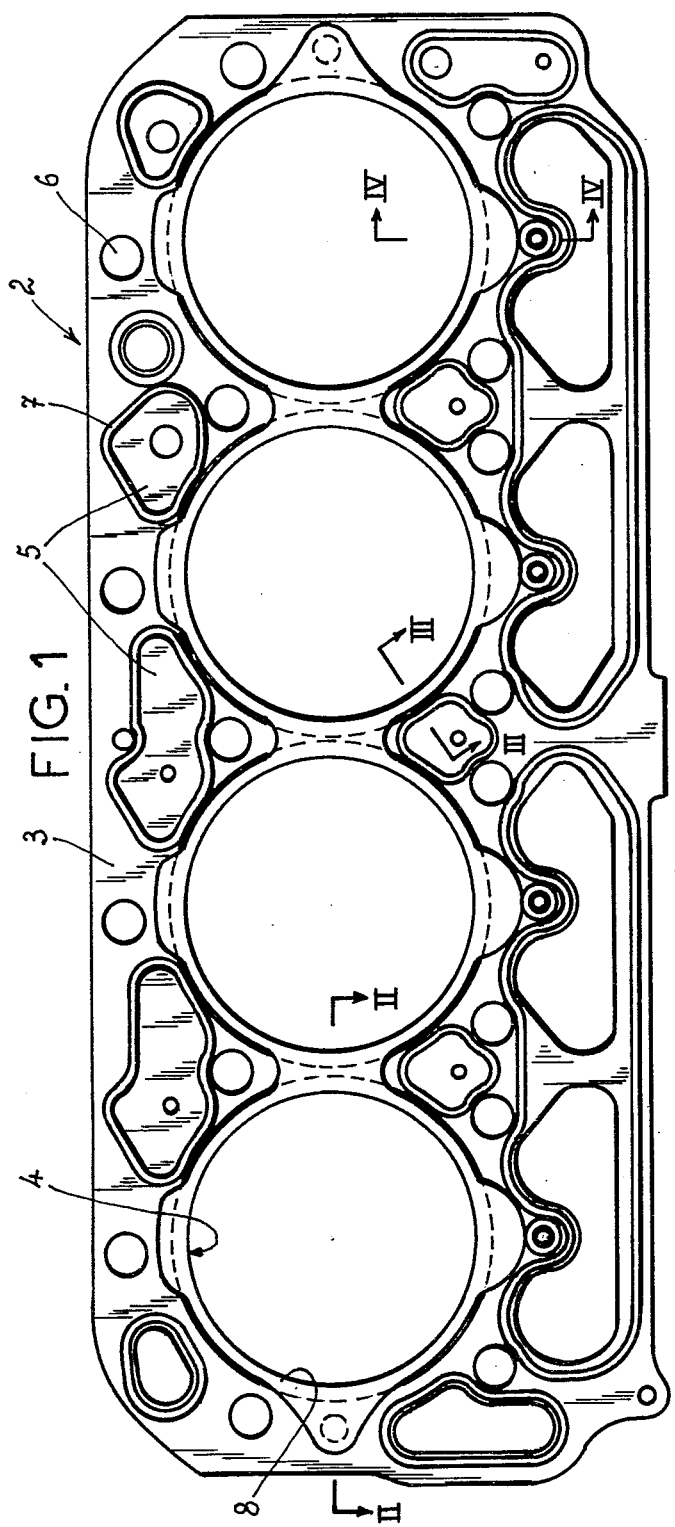
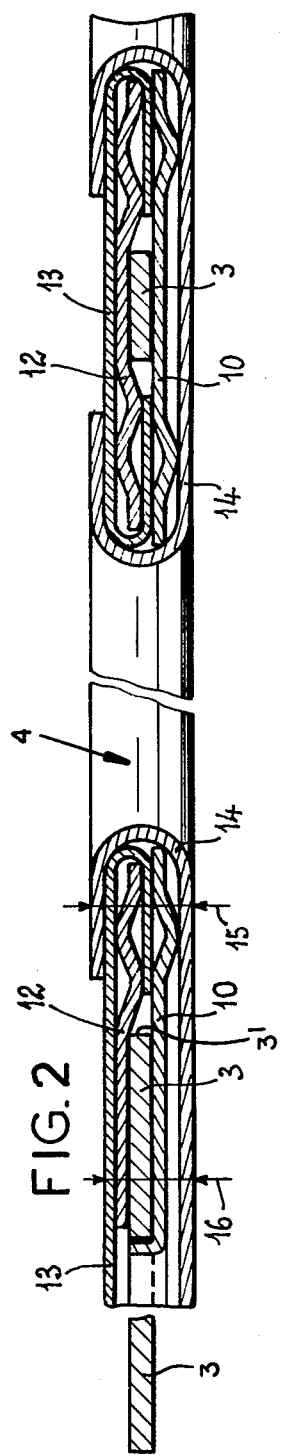

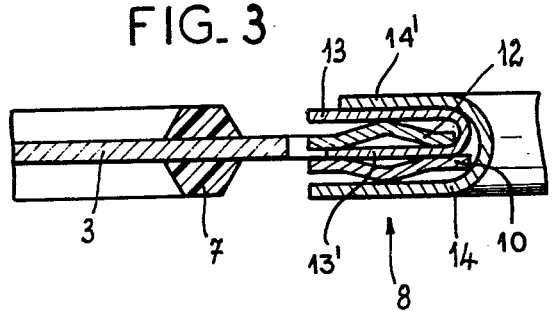
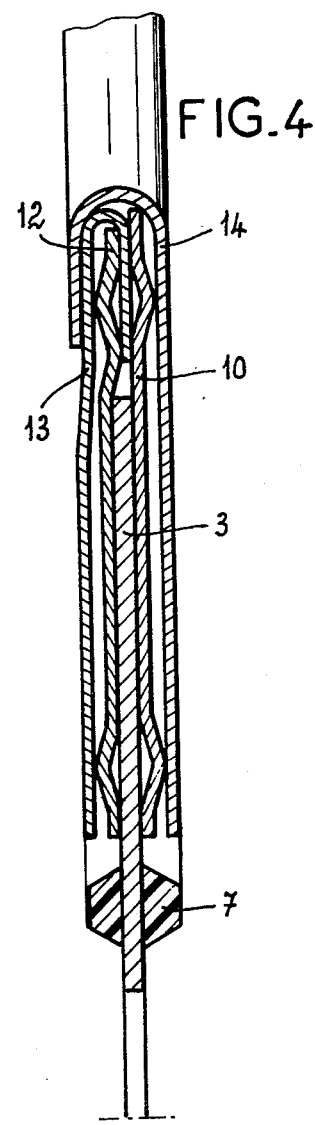
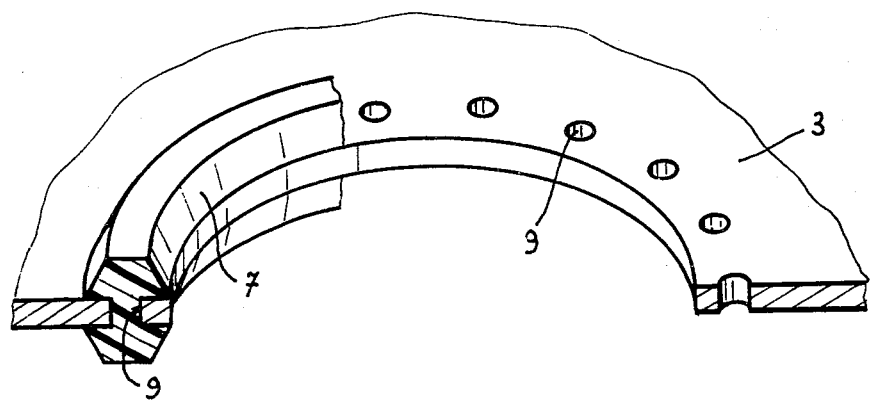

4,468,044

CYLINDER HEAD GASKET FOR INTERNAL COMBUSTION ENGINE

CROSS REFERENCE TO RELATED APPLICATION

This application is related to the commonly assigned copending application Ser. No. 423,090 filed Sept. 24, 1982 by Georges ULMER, one of the present joint inventors.

FIELD OF THE INVENTION

Our present invention relates to a cylinder head gasket for an internal combustion engine and, more particularly, to a cylinder head gasket having a metal plate forming the spine or core of the gasket and provided with improved refractory angular seals for the cylinders and improved fluid seals for the fluid passages.

BACKGROUND OF THE INVENTION

In an internal combustion engine, a cylinder head gasket is generally provided between the cylinder block and the cylinder head and can have openings aligned with the power cylinders of the engine st serve as a seal for the coolant circulation path and for the lubricant circulation path since both the cooling liquid and liquid oil are circulated through the engine block and cylinder head.

Secondly, it must serve as a seal against the escape of combustion gases which are generated at elevated pressures and temperatures within the engine.

Thirdly, it must serve as a seal against the escape of gas-fuel mixtures or flame fronts so as to maintain the pressure of combustion or work expansion within the cylinders.

Fourthly, the cylinder head gasket generally serves as a controlled-thickness spacer between the cylinder head and the engine block, as a support for the cylinder head and the engine block and in part as an alignment member for properly positioning a cylinder head on the engine block.

Finally, in addition to the mechanical support and positioning functions described, the gasket must be capable of compensating for geometric irregularities of the contact surfaces of the engine block and the cylinder head with the seal so that it maintains the initial sealing action in spite of manufacturing irregularities and in spite of deformations of the engine which may occur in the course of operation and with time.

In the past, the different types of sealing actions have resulted in resort to different solutions for the different seals. For example, sealing of the cooling liquid, e.g. a water-glycol mixture, and the lubricating oil was generally accomplished using an asbestos seal in which asbestos fiber layers were applied to a perforated sheet metal support or spine, by a metal fabric received between two fibrous layers of asbestos and elastomer fiber mixtures, or the like.

The pressure sealing in the engine of the cylinders, i.e. the refractory seal, was generally accomplished utilizing refractory sealing rings of metal such as steel, galvanized steel, steel clad with aluminum or the like.

The conventional cylinder head gasket was thus a composite structure which was clamped tightly in place by the tightening of cylinder head bolts.

In most cases the cylinder head gasket had to be clamped so strongly by such bolts, for effective sealing, that deformation of the cylinder head or other parts of the engine resulted simply from the bolt-tightening operation.

Another disadvantage of the earlier systems was that the handling of the asbestos materials created an environmental hazard and particular danger to workers with the product.

To solve in part the problem with fluid sealing in such gaskets, it is known, moreover, to provide elastomeric seals, particularly of silicon elastomers. In general, however, these have not proved to be fully satisfactory.

Another problem has been created by the tendency to utilize, for Diesel engines having precombustion chambers, cylinder blocks designed primarily for gasoline engines. In these cases, the number of cylinder head bolts which can be used is reduced because of the presence of precombustion chambers; sealing problems result.

Note should also be taken of the fact that with conventional composite cylinder head gaskets utilizing asbestos fibers, for example, a part of the tightening force, generally of the order of 50%, is absorbed by the material constituting the gasket. In the case of metallic gaskets a portion of the force is absorbed by the core structure of the gasket while another portion is expended in crushing the refractory seal. As a result, truly effective sealing requires especially strong tightening of the bolts which leads to temporary or permanent deformations of the various parts involved, namely, the cylinder block, the cylinders, the cylinder head, casings or jackets of the system, and especially cylinder head or other parts which may be composed of lightweight materials such as aluminum.

OBJECTS OF THE INVENTION

It is the principal object of the present invention to provide an improved cylinder head gasket which obviates the disadvantages enumerated above.

Another object of this invention is to provide a cylinder head gasket which can provide effective sealing and fulfill the requirements for an efficient gasket as enumerated above without requiring the high degree of tightening of the cylinder head bolts hitherto found to be necessary.

Still another object of the invention is to provide a cylinder head gasket whose use will sharply reduce the tendency toward deformation of other portions of the engine, especially aluminum cylinder heads.

SUMMARY OF THE INVENTION

These objects and others which will become more readily apparent hereinafter are attained, in accordance with the present invention, with a cylinder head gasket which comprises a central support constituted by a metallic plate and formed with openings for the cylinders and with fluid ports. According to the invention the fluid ports are bounded by elastomer strands or beads disposed on opposite surfaces symmetrically of the central plate while the gas seal is formed around each opening by a refractory annulus constituted entirely of a metallic system and comprising a pair of ribbed sheet metal members whose ribs are disposed symmetrically on opposite sides of the metal plate, core or spine of the gasket.

Each of the refractory annuluses can thus comprise around an opening to be sealed:

Two ribbed sheet metal members disposed opposite one another across the support plate whose edge around this opening is set outwardly from the inner parameter of the respective refractory annulus, the inner perimeter of one of these sheet metal members lying in the plane of one face of the plate and a corresponding perimeter of the other sheet member being offset or displaced relative to the first by an amount equal to half the thickness of the plate;

a first sheet metal cover member of a thickness equal to half the thickness of the plate and having a C-shaped free perimeter which reaches between the perimeters of the two ribbed members and which also extends over the offset member where the latter overlies the central plate; and a second sheet metal cover member also having a perimeter in the form of a C which extends in the opposite direction around the perimeters of both the ribbed members and the first cover members while overlying the non-offset ribbed member.

This relationship creates a functional symmetry on opposite sides of the central or support plate permitting symmetrical compression of the elastomeric strands or beads disposed on the plate and thus permits the gasket to be clamped in place with significantly less force and greater capacity to adjust to deformation which may occur in the engine.

The elastomer sealing strands, beads or ribs are disposed symmetrically with respect to the plane of the plate and are compressed without providing a significant resistance to this compression. Practically all of the locking force is thus utilized to compress the refractory annuluses forming the gas seals.

Since the amount of force necessary to provide a gas seal is the same in the present system as in the prior art systems, the total locking force is sharply reduced by the amount of force which was previously necessary to compress other parts of the gasket and was otherwise expanded in compression of the central member.

It has been found that the clamping force can be reduced approximately by half and thus the danger of deformation of a cylinder head or of liners is greatly reduced and practically eliminated.

The symmetrical disposition of the elastomeric sealing ribs and the ribs of the refractory annuluses with respect to the central plate ensure the uniform compression of the elastomeric sealing cords by the order of 30% in thickness. This guarantees effective sealing without fatigue unlike asymmetrical systems in which the compression on one surface of the plate can be 10% while compression on another side of the plate can be 50% for two different sealing ribs.

It may be noted that the thickness of the refractory annuluses in the clamped position is slightly greater than that of the unclamped part location behind the precombustion chambers in the case of a Diesel engine or outwardly of the clamped part. This difference in thickness guarantees an excellent sealing effectiveness against gases by the refractory annuluses.

Because the core plate is set back from the actual opening surrounded by the refractory annuluses, it can be composed of a material different from that of the refractory annuluses, e.g. of an aluminum-based alloy. Of course, the sheet metal members of the refractory annulus can be composed of stainless steel.

The gasket can be provided with bosses, ribs, flanges, reinforcing channels and the like which, together with the intercylinder web provides mechanical reinforcement along the two axes of each refractory annulus.

The elastomeric cords constituting these seals for the liquid passages can be provided in various ways so as to limit to a maximum degree lateral flow. Preferably these cords are molded in place on the central plate so that portions of the elastomeric material pass through holes in this plate. Of course, other formations may be utilized to hold the cords in place or they may be molded separately from the plate and cemented to the latter.

BRIEF DESCRIPTION OF THE DRAWING

The above and other objects, features and advantages of the present invention will become more readily apparent from the following description, reference being made to the accompanying drawing in which:

FIG. 1 is a plan view of a cylinder head gasket for a Diesel engine according to the invention;

FIG. 2 is a cross sectional view drawn to a greatly enlarged scale and taken along the line II—II of FIG. 1;

FIG. 3 is a cross sectional view along the line III—III of FIG. 1 also to a larger scale;

FIG. 4 is a sectional view taken along the line IV—IV of FIG. 1 to the same larger scale as FIGS. 2 and 3; and FIG. 5 is a perspective view showing a liquid seal for the gasket molded in place, the view being partly broken away.

SPECIFIC DESCRIPTION

The engine gasket 2 shown in FIGS. 1 through 4 is intended to be used as a cylinder head gasket for a Diesel engine having four cylinders. The gasket comprises a central plate 3 forming the core or spine of the gasket and defining the outline thereof as seen in FIG. 1, this plate being comprised of a metal, e.g. aluminum or an aluminum alloy and being provided with a number of openings 4 which are adapted to be lined with refractory annuluses for the combustion chambers or cylinders of the engine and orifices 5 for passing the liquid coolant and the liquid lubricant.

The locking of the cylinder head gasket between the cylinder head and the cylinder block of an engine is accomplished in the usual manner, i.e. via bolts which traverse the openings 6 provided in the plate 3.

The liquid seals, i.e. the seals for the water-glycol mixture forming the coolant and the oil forming the lubricant, are formed by elastomeric sealing strands or beads 7. The gas-pressure seals for the cylinders are formed by the refractory annuluses 8 comprised entirely of metal.

The elastomeric seals 7 are provided around each liquid passage in a symmetrical manner with respect to the plane of the central metal plate 3 as can be seen in FIGS. 3 through 5.

The seals 7 are formed by molding them of silicone elastomer directly on the plate with portions of the sealing elastomer passing through holes formed in the plate around the liquid passage as shown in FIG. 5 that the annular strands or ribs on opposite sides of each plate for each of the fluid passages are unitary with one another through these holes 9.

Of course, the elastomer seals can also be made by molding independently of their attachment to the plate and can be secured to latter, for example, by adhesive bonding. Preferably, the elastomer seals are of trapezoidal configuration having flanks converging away from the plate 3 as shown, for example, in FIGS. 3 through 5. Of course, these elastomeric sealing ribs can be comprised of other materials as well, namely, nitrile, rubbers, polyacrylics, fluorocarbon elastomers or the like.

Each refractory ring can be constituted by a system comprised entirely of metal and can comprise two ribbed sheet metal members 10 and 11 disposed opposite one another across the plate 3 and bearing directly thereupon on opposite sides of this plate.

The inner perimeter of each member 12 is offset in the direction of the other member 10 with respect to the plane of the central plate 3 while the other member 10 has its face turned toward the plate 3 coplanar therewith so that the member 10 lies effectively in the plane of this surface of the plate 3.

In the region in which they form the refractory ring 8, the two members 10 and 12 are sandwiched between them and outwardly turned flange 13' which forms a C-section portion of a first sheet metal cover member 13 whose thickness is equal to half that of the central plate 3. The flange 13' extends over the ribbed portions of the two members 10 and 12 which are symmetrical with respect to the plane of the plate 3 and which extend inwardly beyond the set-back edge 3' of the latter surrounding each opening 4. The cover member 13 thereafter overlies the member 12, i.e. the ribbed sheet metal member which is offset relative to the plate 3.

The assembly of the members 10, 12 and the first cover member 13, over the portions thereof projecting inwardly beyond the member 3, is enclosed, in turn by a further sheet metal lower member 14 whose C-shaped portion engages in the opposite direction over the inner perimeters of the previously described members and thus has a flange 14' overlying the first cover member 13.

The resulting refractory annulus is thus rigorously symmetrical relative to the central plate 3.

It should be noted that the thickness of the refractory ring is slightly greater in the clamped position than behind this ring. For example, the thickness can be about 1.70 mm at point 15 in FIG. 2 whereas it may be only 1.65 mm at point 16 thereby ensuring exact sealing against the escape of gases as a result of the slightly greater thickness at the most active part of the gas sealing.

The various sectional views and the plane view of FIG. 1 show lugs and other reinforcement not individually identified which together with the intercylinder web of the plate 3 provide sufficient mechanical strength in the two axes of the annular seals of the cylinder openings.

In practice it is found that the elastomeric seal 7 can be compressed without significant resistance during clamping so that practically all of the clamping force is applied to the refractory annuluses. The combustion chambers are thereby effectively sealed with a clamping force substantially less than the clamping force necessary for conventional gaskets.

The central plate can be composed of zinc-plated steel, stainless steel or some other light alloy instead of aluminum as described while the ribbed members can be composed of ordinary steel, galvanized steel or steel clad with aluminum instead of stainless steel. The lower members likewise can be composed of galvanized steel, aluminum clad steel or stainless steel.

The gasket of the invention reduces the possibility of damage to the engine, provides excellent sealing against liquid and gas with reduced force and is completely free from the use of asbestos, thereby eliminating the health problems previously associated with asbestos. The difference between the thicknesses at points 15 and 16 is of the order of 0.05 mm.

We claim:

1. A cylinder head gasket for an internal combustion engine comprising:

a metal central plate formed with a row of openings for cylinders of said engine and a plurality of passages for liquids circulated in said engine;

respective elastomeric beads surrounding said passages and forming liquid seals, said liquid seals being disposed symmetrically on opposite sides of said plate and being affixed thereto; and respective refractory annuluses lining each of said openings and defining gas seals for said openings, said annuluses being composed entirely of metal, said plate being set back from said seals at said opening, each of said annuluses comprising:

a pair of ribbed sheet metal members having said plate received between them and having respective inner ribbed perimeters extending inwardly beyond said plate into each of said openings, the ribs of said perimeters being symmetrical with respect to a plane of said plate, one of said ribbed members being coplanar with a surface of said plate, the other of said ribbed members having its perimeter offset toward said one of said ribbed members, a first sheet metal cover member having a C-section portion reaching over said ribbed members and between said ribbed members while overlying said other ribbed member, and a second sheet metal cover member having a C-section portion reaching around said inner perimeters and said first cover member while underlying said one of said ribbed members.

2. The gasket defined in claim 1 wherein the thickness of each of said annuluses is slightly greater in the clamped portion thereof than outwardly of the clamped portion.

3. The gasket defined in claim 2 wherein the thickness difference is of the order of 0.05 mm.

4. The gasket defined in claim 1 wherein said plate is composed of a different metal than that forming said annuluses.

5. The gasket defined in claim 4 wherein said plate is composed of aluminum.

6. The gasket defined in claim 5 wherein said members are composed of steel.

7. The gasket defined in claim 6 wherein said members are composed of stainless steel.

8. The gasket defined in claim 7 wherein said elastomer is a silicone rubber.

9. The gasket defined in claim 1 wherein the symmetrically displaced beads for each of said passages are molded unitarily with one another through respective holes formed in said plate around each passage.

10. The gasket defined in claim 9 wherein at least the second member is formed in one piece for all of said annuluses.

11. The gasket defined in claim 10 wherein the thickness of each of said annuluses is slightly greater in the clamped portion thereof than outwardly of the clamped portion.

12. The gasket defined in claim 11 wherein the thickness difference is of the order of 0.05 mm.

13. The gasket defined in claim 12 wherein said plate is composed of a different metal than that forming said annuluse.

14. The gasket defined in claim 13 wherein said plate is composed of aluminum.

15. The gasket defined in claim 14 wherein said members are composed of steel.

16. The gasket defined in claim 6 wherein said members are composed of stainless steel.

17. The gasket defined in claim 16 wherein said elastomer is a silicone rubber.

* * * * *